US012563645B2

(12) United States Patent
Ohnishi et al.

(10) Patent No.: US 12,563,645 B2
(45) Date of Patent: Feb. 24, 2026

(54) ELECTRODE-EMBEDDED CERAMIC STRUCTURE

(71) Applicant: NGK Insulators, Ltd., Nagoya (JP)

(72) Inventors: Takao Ohnishi, Niwa-Gun (JP); Daishi Tanabe, Kasugai (JP); Akifumi Morishita, Komaki (JP)

(73) Assignee: NGK INSULATORS, LTD., Nagoya (JP)

(*) Notice: Subject to any disclaimer, the term of this patent is extended or adjusted under 35 U.S.C. 154(b) by 986 days.

(21) Appl. No.: 17/657,766

(22) Filed: Apr. 4, 2022

(65) Prior Publication Data

US 2022/0232672 A1 Jul. 21, 2022

Related U.S. Application Data

(63) Continuation of application No. PCT/JP2020/037656, filed on Oct. 2, 2020.

(30) Foreign Application Priority Data

Oct. 11, 2019 (JP) ................................ 2019-188095

(51) Int. Cl.

| | |
|---|---|
| ***H05B 3/28*** | (2006.01) |
| ***H05B 3/03*** | (2006.01) |
| ***H05B 3/06*** | (2006.01) |
| ***H05B 3/14*** | (2006.01) |
| ***H05B 3/48*** | (2006.01) |

(52) U.S. Cl.

CPC ............... *H05B 3/283* (2013.01); *H05B 3/03* (2013.01); *H05B 3/06* (2013.01); *H05B 3/141* (2013.01); *H05B 3/48* (2013.01)

(58) Field of Classification Search

CPC . H05B 3/283; H05B 3/03; H05B 3/06; H05B 3/141; H05B 3/48

See application file for complete search history.

(56) References Cited

U.S. PATENT DOCUMENTS

2007/0056949 A1* 3/2007 Yoshikawa ............ H05B 3/141 219/270

FOREIGN PATENT DOCUMENTS

| | | | |
|---|---|---|---|
| GB | 2 432 093 | A | 5/2007 |
| GB | 2 442 890 | A | 4/2008 |
| GB | 2 443 361 | A | 4/2008 |
| JP | 2006-120559 | A | 5/2006 |
| JP | 2006-222008 | A | 8/2006 |
| JP | 2006-228713 | A | 8/2006 |

(Continued)

OTHER PUBLICATIONS

JP2011207222A—Translation (Year: 2025).*

(Continued)

*Primary Examiner* — Steven W Crabb
*Assistant Examiner* — Keith Brian Assante
(74) *Attorney, Agent, or Firm* — BURR PATENT LAW, PLLC

(57) ABSTRACT

An electrode-embedded ceramic structure includes: a ceramic shaft, wherein an electrode is disposed on an outer circumference thereof; and a ceramic tube housing the ceramic shaft therein and coupled to the ceramic shaft. In this electrode-embedded ceramic structure, spaces are provided locally between the ceramic shaft and the ceramic tube.

13 Claims, 5 Drawing Sheets

(56) References Cited

FOREIGN PATENT DOCUMENTS

| | | | | |
|---|---|---|---|---|
| JP | 2011207222 | A | * | 10/2011 |
| JP | 2015026577 | A | * | 2/2015 |

OTHER PUBLICATIONS

JP2015026577A—Translation (Year: 2025).*
International Search Report and Written Opinion (Application No. PCT/JP2020/037656) dated Dec. 15, 2020 (with English translation).
English translation of the International Preliminary Report on Patentability (Chapter I) dated Dec. 15, 2020 (Application No. PCT/JP2020/037656).
Extended European Search Report (Application No. 20874607.3) dated Oct. 2, 2023 (8 pages).

* cited by examiner

ELECTRODE-EMBEDDED CERAMIC STRUCTURE

TECHNICAL FIELD

The present specification discloses a technique relating to an electrode-embedded ceramic structure.

BACKGROUND ART

Japanese Patent Application Publication No. 2011-207222 (referred to as Patent Document 1, hereinafter) describes a ceramic structure with an electrode embedded therein (a pillar-shaped ceramic heater). In Patent Document 1, the electrode is firstly printed on a surface of a ceramic sheet. Then, the ceramic sheet is wrapped around a ceramic shaft while being pressed against the ceramic shaft to produce an intermediate in which the ceramic sheet is pressure bonded to the ceramic shaft. After this, the intermediate is fired to bond the ceramic sheet and the ceramic shaft, as a result of which the ceramic heater is produced.

SUMMARY OF INVENTION

As described, in Patent Document 1, the intermediate in which the ceramic sheet is pressure bonded to the ceramic shaft is fired. As a result, the ceramic sheet is bonded and integrated with the ceramic shaft, completing a structure in which the electrode is embedded in the ceramic. The ceramic heater of Patent Document 1 includes a structure in which a matrix (ceramic) has a different material (electrode) from the matrix embedded therein. Thus, the matrix may be degraded, such as the matrix being cracked, for example, due to a thermal expansion rate difference between the ceramic and the electrode. There is a need for improved durability (degradation control) of ceramic structures having an electrode embedded therein. The present specification aims to realize an electrode-embedded ceramic structure with improved durability.

Solution to Technical Problem

An electrode-embedded ceramic structure disclosed in the present specification may comprise a ceramic shaft, wherein an electrode is disposed on an outer circumference thereof; and a ceramic tube housing the ceramic shaft therein and coupled to the ceramic shaft. In this electrode-embedded ceramic structure, spaces may be provided locally between the ceramic shaft and the ceramic tube.

DESCRIPTION OF EMBODIMENTS

Figure 1:
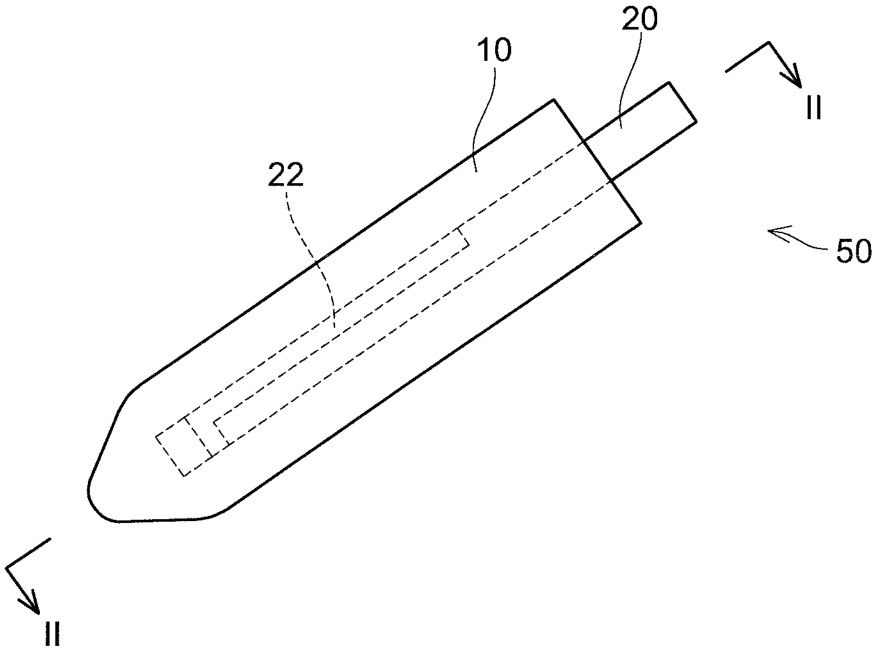
FIG. 1 illustrates a schematic view (perspective view) of an electrode-embedded ceramic structure according to a first embodiment.

An electrode-embedded ceramic structure disclosed in the present specification may comprise a ceramic shaft, wherein an electrode is disposed on an outer circumference thereof; and a ceramic tube housing the ceramic shaft therein and coupled to the ceramic shaft. The electrode-embedded ceramic structure disclosed in the present specification is manufactured by preparing the ceramic shaft that has the electrode (wiring pattern) provided on the outer circumference and the ceramic tube separately, inserting the ceramic shaft into the ceramic tube, and firing this assembly. By firing the assembly with the ceramic shaft inserted in the ceramic tube, the ceramic shaft and the ceramic tube are bonded and thus integrated. That is, the electrode is embedded in the ceramic. In the ceramic shaft before insertion into the ceramic tube, the electrode may not be exposed at a surface (outer circumferential surface) of the ceramic shaft. For example, in the ceramic shaft before insertion into the ceramic tube, a surface of the electrode may be covered by a protection layer or the like.

In the electrode-embedded ceramic structure, spaces may be provided locally between the ceramic shaft and the ceramic tube. Here, "between the ceramic shaft and the ceramic tube" means an interface at which the outer surface of the ceramic shaft joins (contacts) an inner surface of the ceramic tube (inner wall of the tube) before they are bonded. The interface between the ceramic shaft and the ceramic tube can be identified, even after they have been bonded and integrated, based on a distance from the center axis or outer surface of the electrode-embedded ceramic structure, observation of a cross-sectional image of the electrode-embedded ceramic structure, the position of the electrode in a cross-sectional image, or the like.

A material of the ceramic shaft and the ceramic tube may be an alumina-containing material or a zirconia-containing material. Examples of the alumina-containing material include alumina ($Al_2O_3$), mullite ($Al_6O_{13}Si_2$), spinel ($MgAl_3O_4$), etc. Examples of the zirconia-containing material include zirconia ($ZrO_2$), zirconia-containing materials such as partially stabilized zirconia and stabilized zirconia to which yttria ($Y_2O_3$), calcia ($CaO$), etc. are added as stabilizers, etc. A homogeneous material may be used (e.g., the ceramic shaft and the ceramic tube are constituted of alumina) or different materials may be used (e.g., the ceramic shaft is constituted of alumina and the ceramic tube is constituted of zirconia). It is preferable that the ceramic shaft and the ceramic tube are constituted of a homogeneous material to bond them favorably.

The ceramic shaft may have a solid cylinder shape or a hollow cylinder shape. That is, the ceramic shaft may be solid or hollow. In case of the ceramic shaft having a hollow cylinder shape, one end thereof may be closed (bottomed hollow cylinder), both ends thereof may be closed (hollow cylinder), or the both ends may be open. The ceramic shaft with its both ends open can be considered to include a through hole (first through hole) extending axially from one end to the other end. Providing the first through hole in the ceramic shaft allows matter (liquid such as water, a solid such as a metal wire) to be disposed within the ceramic shaft.

The electrode may be disposed on the outer circumference of the ceramic shaft. Providing the ceramic shaft with the electrode allows the electrode-embedded ceramic structure to be used as a heater (ceramic heater). In case of the ceramic shaft including the first through hole, matter can be disposed within the first through hole and be heated therein. For example, platinum (Pt), Au—Pt alloy containing gold (Au), etc. may be used as a material of the electrode. The electrode may be formed on the outer circumferential surface of the ceramic shaft by screen printing, vapor deposition, or the like. Further, a surface of the electrode may be covered by a protection layer after the electrode has been formed on the outer circumferential surface of the ceramic shaft. Although a material of the protection layer is not particularly limited, resin, ceramic, etc. can be used.

The ceramic tube may include a hole for housing the ceramic shaft (housing portion). Specifically, the ceramic tube may have a bottomed hollow cylinder shape including a bottom surface that contacts a longitudinal end surface of the ceramic shaft and an inner circumferential surface that contacts the outer circumferential surface of the ceramic shaft. Further, a through hole (second through hole) communicating with the outside of the ceramic tube may be defined in the bottom surface. In this case, the second through hole may communicate with the first through hole. That is, the ceramic tube may include the second through hole that extends from the housing portion in which the ceramic shaft is housed to the outside of the ceramic tube and communicates with the first through hole. In this case, the first through hole can be depressurized by suction of the first through hole via the second through hole.

Depressurizing the first through hole via the second through hole while matter is disposed within the first through hole allows for adsorption of another material (such as metal) to the matter disposed within the first through hole. That is, the first through hole and the second through hole allow the electrode-embedded ceramic structure to be used as a vacuum adsorption device. Further, as described, providing the ceramic shaft with the electrode allows the electrode-embedded ceramic structure to be used as a heater. Thus, by including the first through hole and the second through hole, the electrode-embedded ceramic structure can adsorb another substance to matter, while heating the matter.

In case of the electrode-embedded ceramic structure including the first through hole and the second through hole, the diameters of the first through hole and the second through hole may be the same or different. In case of the diameters of the first through hole and the second through hole being different, the diameter of the second through hole may be smaller than the diameter of the first through hole. As described, providing the ceramic shaft with the first through hole allows for placement of matter within the first through hole, heating thereof, and adsorption thereto. The diameter of the second through hole being smaller than the diameter of the first through hole reduces leakage of the matter disposed within the first through hole to the outside of the electrode-embedded ceramic structure. Further, in depressurizing (deaerating) the first through hole, a pressure decrease in the first through hole is further facilitated as the diameter of the second through hole is smaller. The outer shape of the ceramic tube may be any shape, and for example, may be a cylinder or polygonal prism.

In the state where the ceramic shaft is inserted in the ceramic tube, the entirety of the longitudinal end surface of the ceramic shaft may be in contact with the ceramic tube or a part thereof may not be in contact therewith. Similarly, in the state where the ceramic shaft is inserted in the ceramic tube, the entirety of the outer circumferential surface of the ceramic shaft may be in contact with the inner circumferential surface of the ceramic tube or a part thereof may not be in contact therewith. Here, "the state where the ceramic shaft is inserted in the ceramic tube" means a state prior to firing of the ceramic shaft and the ceramic tube to bond them.

For example, by providing the end surface of the ceramic shaft and/or the bottom surface of the ceramic tube with a recess, the end surface of the ceramic shaft can be partially non-contact with the bottom surface of the ceramic tube. Similarly, by providing the outer circumferential surface of the ceramic shaft and/or the inner circumferential surface of the ceramic tube with a recess, the outer circumferential surface of the ceramic shaft can be partially non-contact with the inner circumferential surface of the ceramic tube. By maintaining the ceramic shaft and the ceramic tube partially non-contact with each other in the state where the ceramic shaft is inserted in the ceramic tube, spaces are provided locally between the ceramic shaft and the ceramic tube.

Further, a pore-forming material may be added to the ceramic shaft and/or the inside of the ceramic tube, and the pore-forming material may be eliminated upon firing the electrode-embedded ceramic structure (the ceramic shaft and the ceramic tube). This method can also provide spaces locally between the ceramic shaft and the ceramic tube. Polymer particles, carbon particles, etc. can be used as the pore-forming material. A space volume (space ratio) of the entire electrode-embedded ceramic structure and a space volume (space ratio) between the ceramic shaft and the ceramic tube can be controlled by adjusting the kind of pore-forming material (material, particle size) and an amount of the pore-forming material to be added.

Further, spaces can also be provided between the ceramic shaft and the ceramic tube by controlling a firing condition for the electrode-embedded ceramic structure (firing temperature, firing time, etc.) as well. As described, the electrode-embedded ceramic structure disclosed in the present specification is manufactured by preparing the ceramic shaft and the ceramic tube separately, inserting the ceramic shaft into the ceramic tube, and then firing the assembly. Thus, before firing (in the state where the ceramic shaft is inserted in the ceramic tube), there is a distinct interface between the ceramic shaft and the ceramic tube. Then, during firing, bonding progresses at the interface between the ceramic shaft and the ceramic tube, and thus they are integrated. By controlling the firing condition, a degree of the bonding (progress of the bonding) between the ceramic shaft and the ceramic tube can be controlled and spaces can be provided at parts between the ceramic shaft and the ceramic tube.

As described, in the electrode-embedded ceramic structure disclosed in the present specification, spaces are provided locally between the ceramic shaft and the ceramic tube. Thus, for example, when the electrode generates heat or when the electrode-embedded ceramic structure is heated, a force applied from the electrode to the ceramic can be mitigated by the spaces between the ceramic shaft and the ceramic tube. Specifically, it is possible to suppress cracks in the ceramic (the ceramic shaft and the ceramic tube) caused by a thermal expansion rate difference between the matrix (the ceramic) and the electrode. Providing spaces between the ceramic shaft and the ceramic tube allows for improved durability of the electrode-embedded ceramic structure.

The space volume (space ratio) between (at the interface between) the ceramic shaft and the ceramic tube can be determined from an image of a cross section of the electrode-embedded ceramic structure (a cross section along a plane including the ceramic shaft or a cross section along a plane perpendicular to the ceramic shaft). Specifically, a SEM image of a cross section of the ceramic structure is firstly obtained to identify the interface between the ceramic shaft and the ceramic tube. Then, an area of the spaces per 1 μm of the interface length is measured. The area of the spaces can be calculated, for example, by image-processing the obtained SEM image by ITEM analysis software (manufactured by Seika Corporation). The area of the spaces per 1 μm of the interface length (space area/μm) may be 0.3 $\mu m^2$ or more. With the space area of 0.3 $\mu m^2$, the force applied from the electrode to the ceramic is sufficiently mitigated, and thus the electrode-embedded ceramic structure can have improved durability.

The space area at the interface of the ceramic shaft and the ceramic tube may be 0.5 $\mu m^2$ or more, 1 $\mu m^2$ or more, 1.5 $\mu m^2$ or more, or 2 $\mu m^2$ or more. The force applied to the ceramic is further mitigated as the space area per 1 μm of the interface length is larger. Further, the space area at the interface between the ceramic shaft and the ceramic tube may be 5 $\mu m^2$ or less. With the space area of 5 $\mu m^2$ or less, the ceramic shaft and the ceramic tube are sufficiently joined (bonded) and thus separation of the ceramic shaft from the ceramic tube due to an impact can be prevented. The space area at the interface between the ceramic shaft and the ceramic tube may be 4.5 $\mu m^2$ or less, 4 $\mu m^2$ or less, 3.5 $\mu m^2$ or less, or 3 $\mu m^2$ or less.

It is preferable that the spaces are uniformly distributed over the interface between the ceramic shaft and the ceramic tube. For example, when the interface between the end surface of the ceramic shaft and the ceramic tube is equally divided into four sections in an image of a cross section along a plane including the axis of the ceramic shaft, it is preferable that the spaces are observed in two or more sections of the four sections. It is more preferable that the spaces are observed in all of the four sections. Further, where the interface between a side surface (outer circumferential surface) of the ceramic shaft and the ceramic tube is equally divided into four sections (except for a portion where the electrode is disposed) in the same cross-sectional image, it is preferable that the spaces are observed in two or more sections, and it is more preferable that the spaces are observed in all of the four sections. Similarly, where the interface is equally divided into four sections (except for the portion where the electrode is disposed) in a cross section along a plane perpendicular to the axis of the ceramic shaft, it is preferable that the spaces are observed in two or more sections, and it is more preferable that the spaces are observed in all of the four sections.

EMBODIMENTS

First Embodiment

Figure 2:
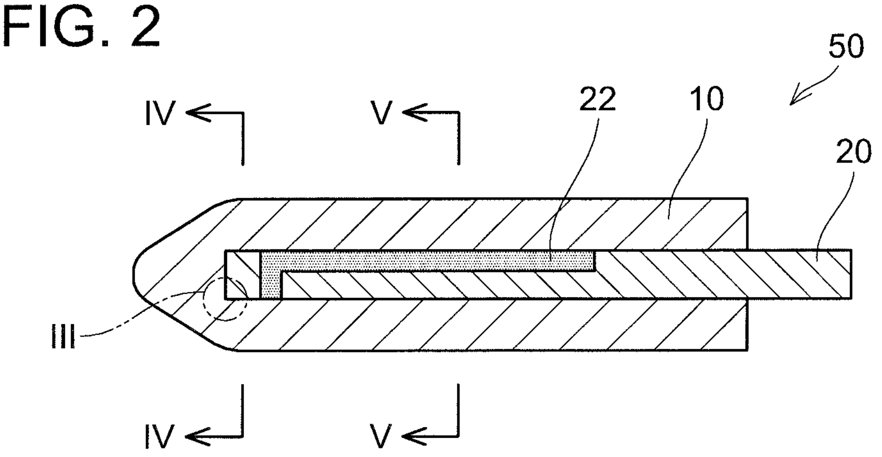
FIG. 2 illustrates a cross-sectional view along a line II-II in FIG. 1.

Referring to the drawings, a ceramic structure 50 is described. The ceramic structure 50 is an example of the electrode-embedded ceramic structure. The ceramic structure 50 is used as a ceramic heater. As illustrated in FIGS. 1 and 2, the ceramic structure 50 comprises a ceramic shaft 20 that has a solid cylinder shape and has electrodes 22 disposed on an outer circumference (outer circumferential surface) thereof and a ceramic tube 10 that has a bottomed hollow cylinder shape. The outer shape of the ceramic tube 10 is substantially cylindrical, however, its end portion at an end has a substantially conical shape with its diameter decreasing toward the end. The ceramic shaft 20 is housed in the ceramic tube 10. The ceramic shaft 20 and the ceramic tube 10 are constituted of alumina, and are bonded and integrated with each other. Thus, the electrodes 22 are embedded in the ceramic.

Figure 3:
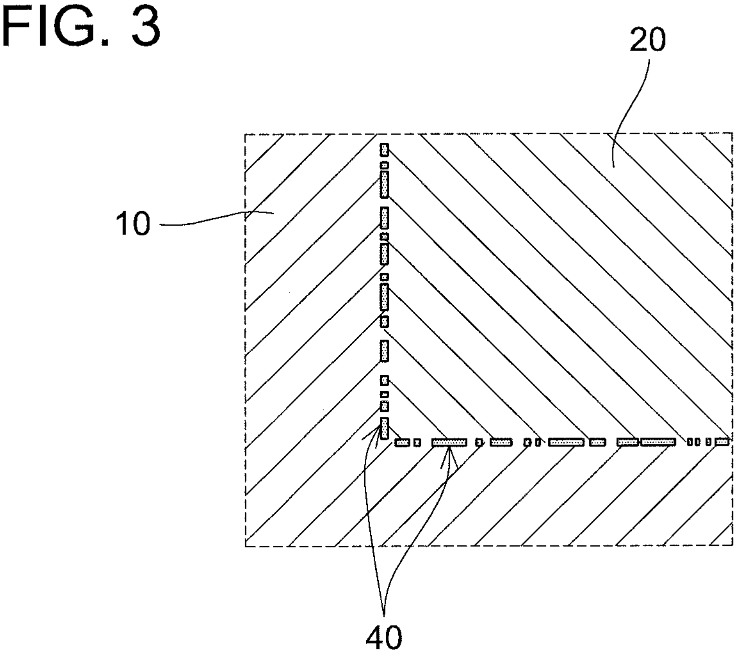
FIG. 3 illustrates an enlarged view of an area enclosed by a broken line III in FIG. 2.

FIG. 3 is a part of a cross section including the axis of the ceramic shaft 20 (longitudinal cross section) and an enlarged view of a broken-line area III in FIG. 2. As illustrated in FIG. 3, spaces 40 are provided at intervals at an interface between the ceramic shaft 20 and the ceramic tube 10. The spaces 40 are distributed almost uniformly over the interface between the ceramic shaft 20 and the ceramic tube 10. At portions where no spaces 40 are provided, the ceramic shaft 20 and the ceramic tube 10 are bonded. In FIG. 3, the spaces 40 are depicted in relatively large size and in a schematic manner to assist in understanding features of the ceramic structure 50. In actuality, the spaces do not have a specific shape and vary in size.

Figure 4:
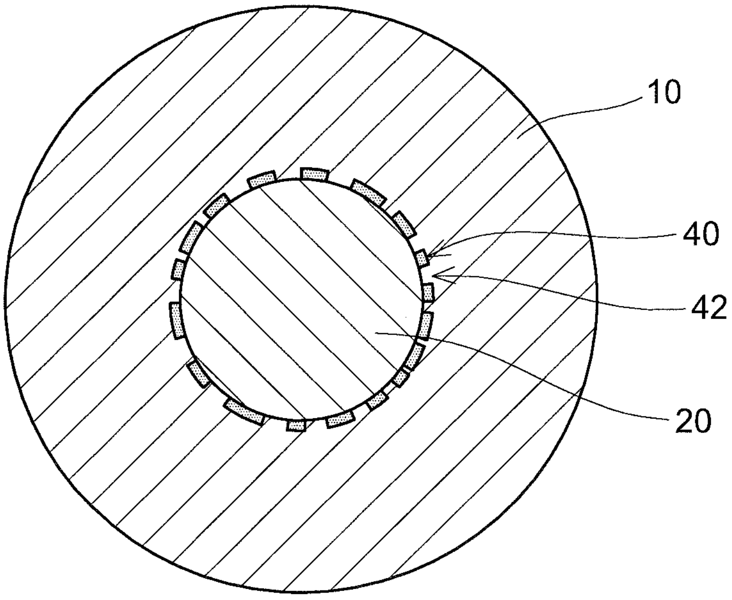
FIG. 4 illustrates a cross-sectional view along a line IV-IV in FIG. 2.

FIG. 4 illustrates a cross section perpendicular to the axis of the ceramic shaft 20 (radial cross section) and illustrates a cross section along a line IV-IV in FIG. 2. As apparent from FIG. 4, the ceramic shaft 20 has a solid structure. As illustrated in FIG. 4, in a circumferential direction of the ceramic shaft 20 as well, the spaces 40 are provided at intervals and almost uniformly over the interface between the ceramic shaft 20 and the ceramic tube 10. In other words, bonded portions 42 where the ceramic shaft 20 and the ceramic tube 10 are bonded are provided at intervals and almost uniformly in the circumferential direction of the ceramic shaft 20. This mitigates a circumferential local concentration of internal stress caused when the ceramic structure 50 was fired (shrink fitted). In FIG. 4 as well, the spaces 40 are schematically depicted in relatively large size.

Figure 5:
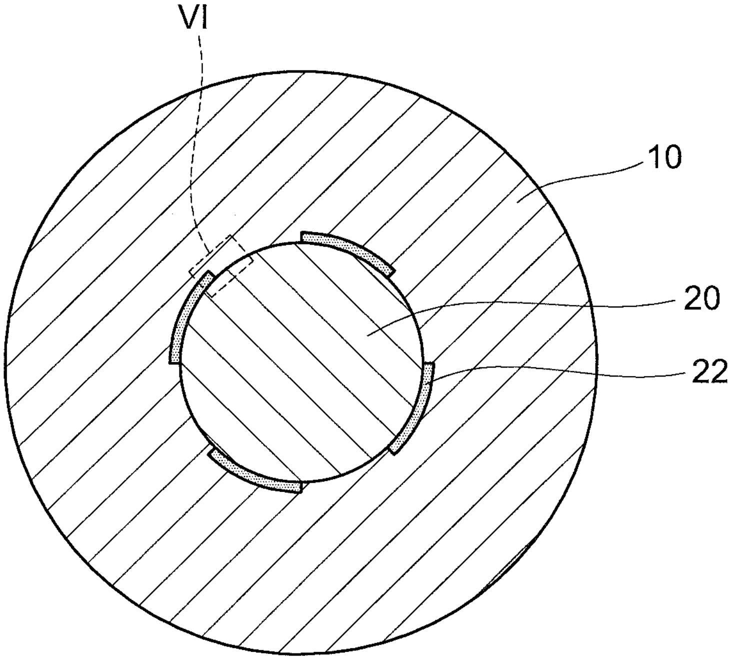
FIG. 5 illustrates a cross-sectional view along a line V-V in FIG. 2.

FIG. 5 illustrates a cross section perpendicular to the axis of the ceramic shaft 20 (radial cross section) for portions where the electrodes 22 are disposed and illustrates a cross section along a line V-V in FIG. 2. In FIG. 5, the spaces at the interface between the ceramic shaft 20 and the ceramic tube 10 are not illustrated to clearly show the state of the electrodes 22. As illustrated in FIG. 5, front and rear surfaces of the electrodes 22 contact the ceramic (the ceramic shaft 20 and the ceramic tube 10). That is, the electrodes 22 are embedded in the ceramic configuring the ceramic structure 50. In the ceramic structure 50, the electrodes 22 do not fully circumferentially extend, and there are portions between the electrodes 22, 22 where the ceramic shaft 20 and the ceramic tube 10 are bonded.

Figure 6:
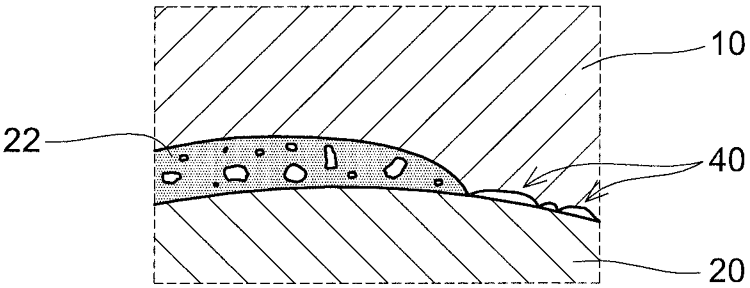
FIG. 6 illustrates an enlarged view of an area enclosed by a broken line VI in FIG. 5.

FIG. 6 is an enlarged view of a border between a portion where an electrode 22 is disposed and a portion where no electrodes 22 are disposed (contact portion between the ceramic shaft 20 and the ceramic tube 10) and illustrates an area enclosed by a broken line VI in FIG. 5. As shown in FIG. 6, no spaces are observed at an interface between the electrode 22 and the ceramic shaft 20 and at an interface between the electrode 22 and the ceramic tube 10. On the other hand, the spaces 40 are observed at intervals at the interface between the ceramic shaft 20 and the ceramic tube 10.

As illustrated in FIGS. 3 to 6, in the ceramic structure 50, the spaces 40 are provided at intervals and almost uniformly over the interface between the ceramic shaft 20 and the ceramic tube 10. Thus, the spaces 40 can reduce a force applied to the ceramic due to a thermal expansion rate difference between the electrodes 22 and the ceramic. On the other hand, no spaces are provided between the electrodes

22 and the ceramic. This prevents heat transfer between the electrodes 22 and the ceramic upon heat generation by the electrodes 22 from being cut off, realizing a heater with high responsivity (the temperature of the ceramic changes responsively according to temperature change of the electrodes 22).

Figure 7:
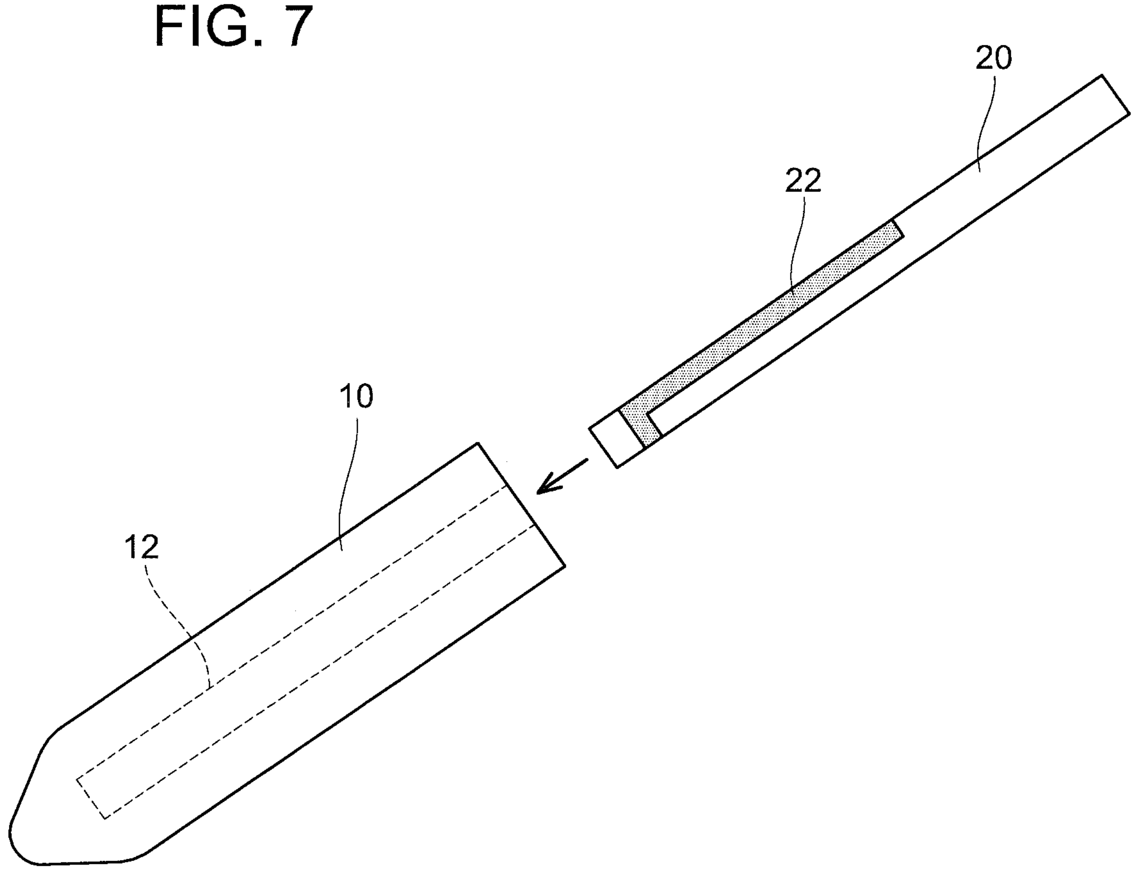
FIG. 7 illustrates a manufacturing process of the electrode-embedded ceramic structure.

Referring to FIG. 7, a manufacturing method of the ceramic structure 50 is described. For the ceramic structure 50, firstly the ceramic shaft 20 that is constituted of alumina and has the electrodes (Pt electrodes) 22 vapor deposited on its surface was prepared, the ceramic tube 10 constituted of alumina in which a hole (bottomed hole) 12 is provided at the center was prepared separately from the ceramic shaft 20, and the ceramic shaft 20 was inserted into the hole 12. That is, the hole 12 is a housing portion for housing the ceramic shaft 20. The ceramic shaft 20 was inserted until its end surface contacts the bottom of the hole 12. The diameter of the hole 12 is constant from its one end to the other end, and is substantially equal to the diameter of the ceramic shaft 20. Thereafter, firing was performed at 1600° C. in the atmosphere, resulting in the ceramic structure 50. For the ceramic structure 50, images of cross sections shown in FIGS. 3 to 5 were captured, and it was observed that spaces were provided almost uniformly over the interface between the ceramic shaft 20 and the ceramic tube 10. Further, as a result of measurement for an area of the spaces per 1 μm of an interface length over 100 μm of the interface, the area of the spaces was 0.3 $\mu m^2/\mu m$.

A characteristic (durability) of the ceramic structure 50 was evaluated. Specifically, a test (thermal shock test) was conducted where one cycle of the test incudes a process of: repeatedly changing a voltage applied to the electrodes 22; increasing the temperature of the ceramic structure 50 to 600° C. in 10 seconds; and cooling it to 100° C. in 20 seconds. As a comparative example, a ceramic structure was manufactured in a conventional manufacturing method, that is, by preparing a ceramic sheet that is constituted of alumina and has Pt electrodes printed on its surface, wrapping the ceramic sheet around a ceramic shaft constituted of alumina while pressing the ceramic shaft against the ceramic sheet, and then firing the assembly at 1600° C. in the atmosphere. In the ceramic structure of the comparative example, the interface between the ceramic sheet and the ceramic shaft were entirely bonded and spaces were hardly observed at the interface. Specifically, the area of spaces was less than 0.01 $\mu m^2/\mu m$.

As a result of the test above, the ceramic structure of the comparative example had cracks at the interface between the ceramic sheet and the ceramic shaft in $20^{th}$ cycle. On the other hand, in the ceramic structure 50, no cracks were observed at the interface between the ceramic shaft 20 and the ceramic tube 10 even after 100 cycles. It has been confirmed that in the ceramic structure 50, the spaces 40 between the ceramic shaft 20 and the ceramic tube 10 mitigate thermal shock due to the thermal expansion rate difference between the electrodes 22 and the ceramic (the ceramic shaft 20 and the ceramic tube 10) and suppress degradation of the ceramic.

Figure 8:
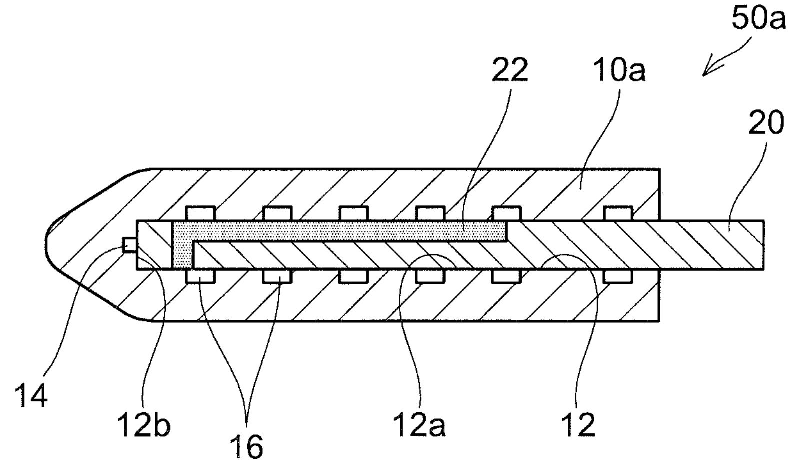
FIG. 8 illustrates a variant of the electrode-embedded ceramic structure according to the first embodiment (in cross-sectional view)

In the embodiment above, the ceramic structure 50 is described as including the ceramic tube 10 in which the hole 12, of which diameter is constant from its one end to the other end, is defined. However, such as a ceramic structure 50*a* illustrated in FIG. 8, a ceramic tube 10*a* in which the hole 12 includes a recess 14 at a bottom surface 12*a* and a plurality of recesses 16 at an inner circumferential surface 12*b* can be used. The recesses 16 extend entirely on the inner circumferential surface of the ceramic tube 10*a*. By providing the recess 14, a space is surely provided between the ceramic shaft 20 and the ceramic tube 10*a* at the end surface of the ceramic shaft 20. Similarly, by providing the recesses 16, spaces are surely provided between the ceramic shaft 20 and the ceramic tube 10*a* at the outer circumferential surface of the ceramic shaft 20.

As a variant of the ceramic structure 50*a*, only the recess 14 may be provided and the recesses 16 may not be provided, or the recess 14 may not be provided and only the recesses 16 may be provided. Further, the recesses 16 may not entirely extend on the inner circumferential surface of the ceramic tube 10*a*, for example, may be provided at intervals in the circumferential direction. Alternatively, the recesses 16 may be provided to face the ceramic shaft 20 in portions where the electrodes 22 are not provided.

Second Embodiment

Figure 9:
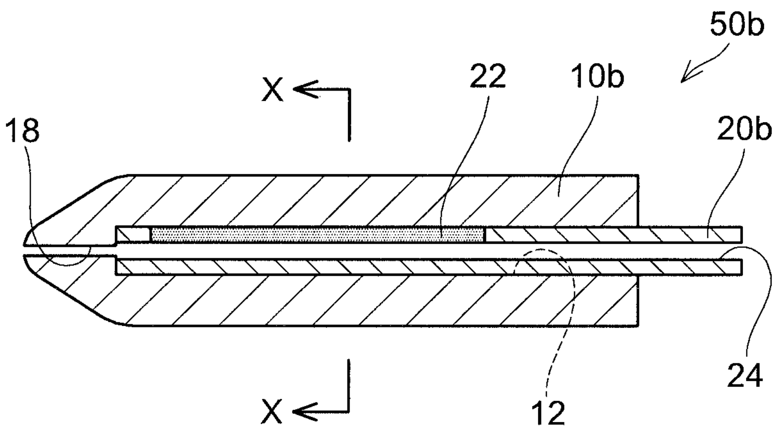
FIG. 9 illustrates a cross-sectional view of an electrode-embedded ceramic structure according to a second embodiment.
Figure 10:
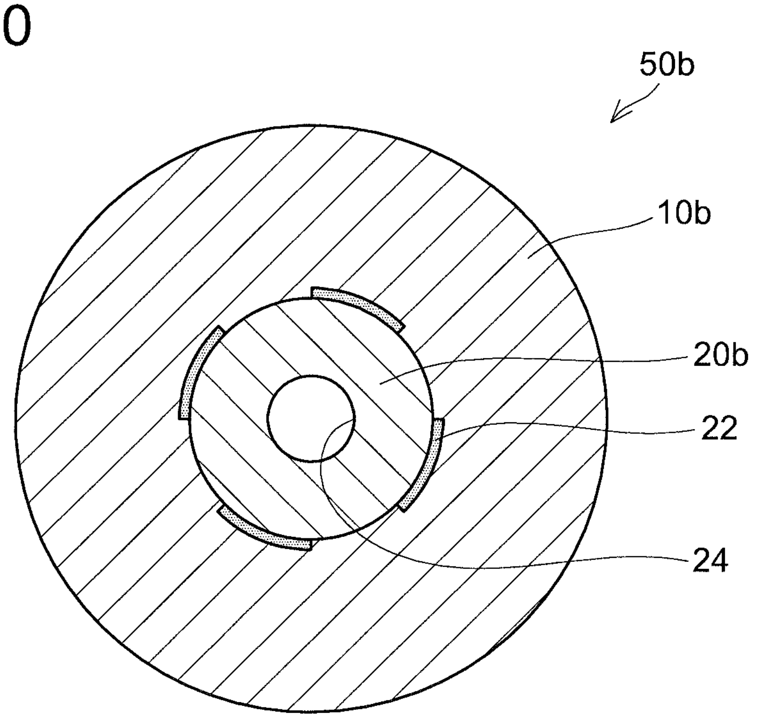
FIG. 10 illustrates a cross-sectional view along a line X-X in FIG. 9.

Referring to FIGS. 9 and 10, a ceramic structure 50*b* is described. The ceramic structure 50*b* is a variant of the ceramic structure 50, and comprises a ceramic shaft 20*b* and a ceramic tube 10*b* including through holes, which is different from the ceramic shaft 20 and the ceramic tube 10 of the ceramic structure 50. Elements of the ceramic structure 50*b* that are substantially the same as those of the ceramic structure 50 are denoted with the same reference signs as those used for the ceramic structure 50 and descriptions for these elements may be omitted. FIG. 9 corresponds to the cross section illustrated in FIG. 2 in connection with the ceramic structure 50, and FIG. 10 corresponds to the cross section illustrated in FIG. 5 in connection with the ceramic structure 50.

As illustrated in FIG. 9, the ceramic shaft 20*b* includes a first through hole 24 axially extending from one end to the other end. That is, the ceramic shaft 20*b* has a hollow structure. As illustrated in FIG. 10, the first through hole 24 is open at both axial ends. The diameter of the first through hole 24 is adjusted to 200 to 3000 μm (may be 200 to 1000 μm). Further, the electrodes 22 are disposed on the outer circumferential surface of the ceramic shaft 20*b* at intervals circumferentially. The electrodes 22 are embedded in a ceramic resulting from the ceramic shaft 20*b* and the ceramic tube 10*b* being bonded and integrated.

The ceramic tube 10*b* includes a second through hole 18 extending from the bottom (surface contacting the axial end surface of the ceramic shaft 20*b*) of the hole (housing portion) 12 to the outside of the ceramic tube 10*b*. The second through hole 18 communicates with the first through hole 24. The diameter of the second through hole 18 is adjusted to 20 to 1000 μm (may be 20 to 300 μm). That is, the diameter of the second through hole 18 may be smaller than the diameter of the first through hole 24. The ceramic structure 50*b* can be considered to include a through hole extending axially from its one end to the other end (the first through hole 24 and the second through hole 18).

With matter (liquid, solid) disposed within the first through hole 24, the ceramic structure 50*b* can be used as a heater for heating the matter. Further, the ceramic structure 50*b* can be used as a vacuum adsorption device that adsorbs another substance to the matter within the first through hole 24 by depressurizing the first through hole 24 though deaeration of gas in the first through hole 24 via the second through hole 18. In this case, it is possible to adsorb another substance to the matter while heating the matter within the first through hole 24 by turning on the heater. Typically, the higher the temperature of the matter becomes, the faster the adsorption rate becomes. The ceramic structure 50*b* can be used as a vacuum adsorption device with a heater.

As a variant of the ceramic structure 50*b*, a configuration may be employed in which the ceramic shaft 20*b* includes the first through hole 24 and the ceramic tube 10*b* does not include the second through hole 18 (i.e., a configuration in which the ceramic tube 10 is used instead of the ceramic tube 10*b*). Such a configuration can also allow for placement of matter within the first through hole 24 and heating thereof. The diameters of the first through hole 24 and the second through hole 18 can be varied appropriately depending on the purpose, for example, the diameters of the first through hole 24 and the second through hole can be equal to each other.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

The invention claimed is:

1. An electrode-embedded ceramic structure comprising:

a ceramic shaft, wherein an electrode is disposed on an outer circumference thereof; and a ceramic tube housing the ceramic shaft therein and coupled to the ceramic shaft, wherein spaces are provided locally between a portion of the ceramic shaft on which the electrode is not disposed and the ceramic tube.

2. The electrode-embedded ceramic structure according to claim 1, wherein the spaces are each 0.3 $\mu m^2$ or more per 1 μm of an interface length between the ceramic shaft and the ceramic tube.

3. The electrode-embedded ceramic structure according to claim 2, wherein the spaces are provided at intervals in a circumferential direction of the ceramic shaft.

4. The electrode-embedded ceramic structure according to claim 3, wherein the ceramic shaft includes a first through hole axially extending from one end to another end.

5. The electrode-embedded ceramic structure according to claim 4, wherein the ceramic tube includes a second through hole that extends from a housing portion in which the ceramic shaft is housed to outside of the ceramic tube and communicates with the first through hole.

6. The electrode-embedded ceramic structure according to claim 5, wherein a diameter of the second through hole is smaller than a diameter of the first through hole.

7. The electrode-embedded ceramic structure according to claim 6, wherein a material of the ceramic shaft and ceramic tube is an alumina-containing material or zirconia-containing material.

8. The electrode-embedded ceramic structure according to claim 7, wherein the ceramic shaft and the ceramic tube are constituted of a homogeneous material.

9. The electrode-embedded ceramic structure according to claim 8, wherein the electrode-embedded ceramic structure is a heater.

10. The electrode-embedded ceramic structure according to claim 1, wherein the spaces are provided at intervals in a circumferential direction of the ceramic shaft.

11. The electrode-embedded ceramic structure according to claim 1, wherein the ceramic shaft includes a first through hole axially extending from one end to another end.

12. The electrode-embedded ceramic structure according to claim 1, wherein a material of the ceramic shaft and ceramic tube is an alumina-containing material or zirconia-containing material.

13. The electrode-embedded ceramic structure according to claim 1, wherein the electrode-embedded ceramic structure is a heater.

* * * * *